Sept. 4, 1962  A. GIERER ET AL  3,052,606
VIRAL MUTATION WITH NITRITES
Filed Aug. 28, 1959
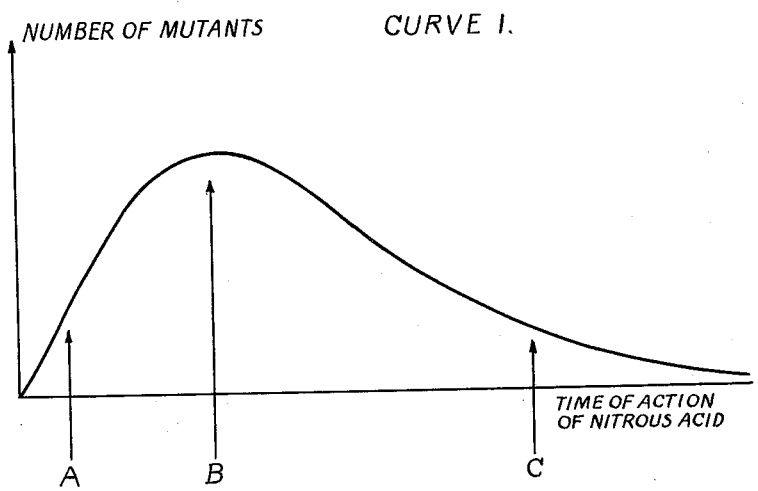
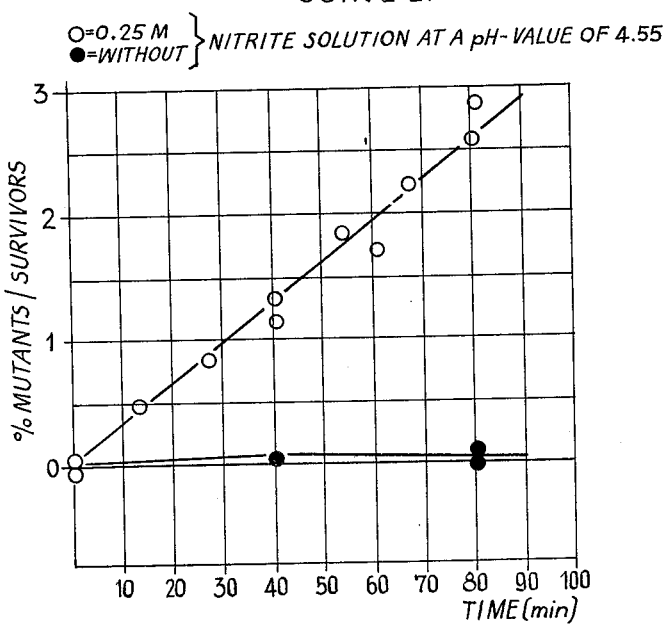
INVENTORS
ALFRED GIERER
WOLFGANG MUNDRY

3,052,606
VIRAL MUTATION WITH NITRITES

Alfred Gierer, Schwabach, near Nurnberg, and Wolfgang Mundry, Tubingen, Germany, assignors to Behringwerke Aktiengesellschaft, Marburg (Lahn), Germany, a corporation of Germany
Filed Aug. 28, 1959, Ser. No. 836,827
Claims priority, application Germany Aug. 30, 1958
5 Claims. (Cl. 167—78)

The present invention relates to a process of preparing virus mutants.

Various mutagens have become known since X-rays and chemical agents enabled experimental mutagenesis to be carried out. Although the mutagens exhibit a great variety of physical and chemical properties, most of them have only the end effect in common which is produced in different manner, that is the descendants of objects treated with mutagens include an increased number of aberrant forms having novel characteristics of hereditary constancy.

Numerous results obtained during the last years indicate that nucleic acid is the biochemical basis for the phenomenon of inheritance. Mutagenic processes should therefore involve an alteration of the genetically important nucleic acids. Such alterations occur in the nature only within the living cell during metabolism.

Genetically active alterations of nucleic acid in vitro have not yet become known.

We have now found that virus mutants can be prepared in vitro by subjecting a virus or its isolated nucleic acid to the action of nitrous acid as the mutagenic substance until partial inactivation has occurred.

The nitrous acid in the virus solution is advantageously set free from alkali metal nitrite by means of a dilute weak acid, or produced by introducing a nitrogen oxide into the solution. Sometimes it may be advantageous following the treatment of the viruses or their nucleic acids to remove the unreacted portion of the nitrous acid used.

The process of this invention can be carried out in a slightly acid to about neutral reaction medium. The reaction velocity increases as the pH value decreases. In the case of zoopathogenic viruses which are very instable, it is advantageous to carry out the reaction at a pH value above 5. Also at this pH value the reaction can be carried out within a period of some minutes. The temperature to be observed is limited by the stability of the infectious material.

The nitrous acid is removed from the virus solution or the corresponding nucleic acid solution, for example by dialysis; the nitrous acid in excess can also be separated, for example by precipitating or centrifuging the infectious material.

The formation of mutants can be recognized, for example by the symptoms of disease. Treated viruses or their isolated nucleic acids, for example produce symptoms on an appropriate host which have not been caused by the starting virus material. A variety of different mutants can be isolated by inoculating a virus-nucleic acid or a virus treated with nitrous acid into a virus-propagating system on which the individual focuses of infection are produced.

Subcultures of such individual focuses yield a series of different virus mutants of which a great percentage exhibits characteristics other than the starting substance. The novel characteristics possess hereditary stability.

The selection of the mutants is governed by the purpose which they shall serve for example for combatting pesticides where pathogenic forms may be desirable, while antipathogenic forms may be required for immunization. Moreover, antipathogenic forms can be used for plant protection due to their interference activity.

The process of this invention enables virus mutants to be obtained with less expenditure of time and energy and in better yields than by the mutagenic processes known so far, and also permits to produce entirely novel mutants.

In the accompanying drawing the curve demonstrates the dependence of the total number of mutants formed on the time during which the nitrous acid is allowed to act upon the infectious material.

In the case where nitrous acid is allowed to act upon the material for a relatively short period of time, mutants can be isolated which are distinguished from the original material by merely one step ("one step mutants") (A). If this time of action is slightly prolonged, the maximum number of mutants is obtained per weight unit of starting material (B). If the time of action is further increased, an especially great portion of mutants is obtained in infectious material (C).

The following examples serve to illustrate the invention but they are not intended to limit it thereto:

EXAMPLE 1

Table I below indicates the mutagenic effect of nitrous acid on virus-ribonucleic acid.

Two parts by volume 0.19% virus-ribonucleic acid obtained from the tobacco-mosaic virus by means of phenol (cf. A. Gierer, and G. Schramm, Z.f. Naturforsch., 11b, 138 (1956)), are mixed at 22° C., at a pH value of 4.8 with one part by volume 4 molar aqueous sodium nitrite solution and one part by volume 1 molar sodium acetate solution. After a time $t$, the virus-ribonucleic acid is diluted to 15γ/ml. by means of 1/15 molar phosphate buffer, and tested.

Control dilutions with untreated virus-ribonucleic acid contain an equivalent amount of sodium nitrite. The total number of infections is indicated as the sum of chlorotic and necrotic lesions per leaf Java-tobacco while the infections caused by mutants are indicated as the number of necrotic lesions per leaf Java-tobacco.

In the table only one definite mutation characteristic was used for quantitative evaluation. The total number of mutants is substantially greater and amounts in the 96-minute group, for example, to 90% of the material which remained infectious.

EXAMPLE 2

The procedure is the same as set forth in Example 1. Nitrous acid is allowed to act upon virus-ribonucleic acid for 96 minutes and the latter is then applied to Xanthi-tobacco resulting in the formation of individual focuses of mutated and unmutated viruses or nucleic acids.

Subcultures of the individual focuses were tested on two different hosts (Samson and Java tobacco). Table II below shows that at most 7 of 60 inoculations exhibited unchanged symptoms while at least 33 mutants were found. The mutants exhibit different and partially strongly weakened symptoms which prove hereditarily constant in further subcultures.

EXAMPLE 3

A pathogenic poliomyelitis virus is mixed with nitrous acid under the conditions described in Example 1 and the individual focuses are tested on a tissue culture. Subcultures of the individual focuses are propagated in an ape kidney culture and the properties of the mutant so prepared are determined by a primate test.

Antipathogenic mutants shall serve as starting material for producing living vaccine.

EXAMPLE 4

The procedure is the same as described in Example 3. The antipathogenic mutants so obtained are again exposed to the mutagenic action of nitrous acid. In this manner a material is obtained whose characteristics are distinguished in further properties from those of the starting substance.

EXAMPLE 5

Mutants of viruses containing deshydroxy-ribonucleic acid (bacteriophage T-2) are produced as follows:

T-2 wild type phages (titer $10^{12}$ P/ml.) stored in phage buffer (pH value 7.0) (M. H. Adams, in Methods in Medical Research, 2, The Year Book Publishers, Chicago, 1950), are diluted 1:50 into 0.25 molar acetate buffer (pH value 4.5). To 3.1 cc. of the dilution obtained is added 0.1 cc. of a 4 molar $NaNO_2$-solution and the resulting mixture is incubated at 20° C. At a time $t=0$ and in intervals of time, samples are withdrawn from the mixture, diluted in a phage buffer and plated ("Top layer"-Method, M. H. Adams, see above), together with $10^8$ cells/plate of *Escherichia coli* B to "Enriched Hershey Agar" (M. H. Adams, see above), so that 200–500 infectious particles are obtained per plate. The infectious particles are incubated for twelve hours at 37° C. and observed on the plates as so-called plaques.

Control tests are made in analogous manner with the exception that $NaNO_2$ is not added to the acetate buffer but to the pH 7.0 buffer of the dilution series in an equivalent concentration.

Curve Sheet 2 indicates that mutated plaques of the type "r" ("rapid lysis," s. A. D. Hershey, Genetics 31, 620–640, 1946), do appear. The number of mutants and the time of incubation in the nitrite mixture increases in linear manner with respect to the survivors. In the control tests a mutant propagation is not observed.

Indiscriminate subcultures of the individual plaques of the mutants are propagated on *E. coli* B and mixed with T-2 wild type phages in the ratio of 1:1. The resulting mixture is subjected to nitrile inactivation as described above until a rate of survival of $5.10^{-4}$ has been reached.

Table III below establishes in the case of 5 examples that at the end of the test the ratio of mutants:wild type has shifted by a factor of at most 2. In other words, the mutants are inactivated in approximately the same manner as the wild type. The propagation of the mutants as shown in Curve Sheet 2 is not, therefore, due to a selection of spontaneously mutated particles already present but due to a mutagenic effect of nitrous acid.

Table I

| Time (minutes) | 1 | 4 | 8 | 16 | 32 | 64 | 96 |
|---|---|---|---|---|---|---|---|
| Total number of all infection focuses | 183 | 130 | 188 | 97 | 63 | 21 | 3.5 |
| Number of necrotizing infection focuses | 1.4 | 2.5 | 4.5 | 5.4 | 6.6 | 2.1 | 0.5 |
| Infection focuses caused by mutants in percent | 0.8 | 1.9 | 2.4 | 5.6 | 10.5 | 9.8 | 15.5 |
| Untreated concentration of ribonucleic acid in γ/ml | | 19 | | 1.9 | 0.19 | | 0.019 |
| Total number of all infection focuses | | 138 | | 42 | 10 | | 0.8 |
| Number of necrotizing infection focuses | | 0.3 | | 0.1 | | | |
| Infection focuses caused by mutants in percent | | 0.2 | | 0.3 | | | |

Table II

| Preparation: Nucleic acid from tobacco-mosaic virus | 20 γ-ribonucleic acid/ml. 96 min. treated with 1 molar $NaNO_2$ at pH 4.8 | controls 0.19 γ/ml. untreated |
|---|---|---|
| Number tested; Individual focuses (of 25 Xanthi-tobacco-leaves) | 60 | 65 |
| Unsuccessful subcultures | 20 | 1 |
| Individual focuses with inaltered virus | 7 | 64 |
| Mutants: | | |
| I. with intense injury of host— | | |
| (a) systematically necrotizing | 4 | 0 |
| (b) mutants with intensified deformation of leaves | 2 | 0 |
| (c) light green mosaic strains | 3 | 0 |
| II. with reduced effect on the host— | | |
| (a) without substantial deformation of the leaves | 5 | 0 |
| (b) types producing stripes on the leaves | 7 | 0 |
| (c) slowly spreading mosaic types | 3 | 0 |
| (d) different weak individual types | 3 | 0 |
| (e) ±masked mutants | 4 | 0 |
| (f) only with primary infection | 2 | 0 |
| Sum (I and II) | 33 | 0 |

Table III

| Incubation time in nitrite mixture (minutes) | 0 | 54 |
|---|---|---|
| Proportion of surviving infectious particles | 1.00 | $5.10^{-4}$ |
| Mutant No. | Mutants/wild type | |
| 1 | 1.47 | 2.85 |
| 2 | 0.51 | 0.43 |
| 3 | 0.79 | 1.67 |
| 4 | 0.91 | 1.82 |
| 5 | 1.92 | 2.85 |

We claim:

1. A process for preparing viable virus mutants which comprises contacting a member of the group consisting of viruses and virus nucleic acids with aqueous nitrous acid in a concentration between about 0.12 and 1 moles per liter for a time between about 1 minute and about 96 minutes, at a pH between about 4.5 and 7 and at about room temperature, and then isolating the individual mutants obtained.

2. A process as claimed in claim 1, wherein following the treatment of a member selected from the group consisting of viruses and isolated nucleic acids, the unreacted nitrous acid is removed.

3. A process as claimed in claim 1, wherein the nitrous acid is liberated from an alkali nitrite by means of a dilute weak acid.

4. A process as claimed in claim 1, wherein the nitrous acid is produced by introduction of nitrogen oxides into the starting virus solution.

5. A process as claimed in claim 1, wherein the mutants obtained are again caused to react with nitrous acid.

References Cited in the file of this patent

FOREIGN PATENTS 112,498     Great Britain _____ Jan. 9, 1918

OTHER REFERENCES

Schramm et al.: Hoppe-Seyler's Zeitschrift für Physiol-Chem., vol. 274, pages 267–275, 1942.

Advances in Enzymology, vol. 5, pages 1–29, and vol. 1, pages 48–50, pub. 1945 and 1941 respectively by Interscience Pub., Inc., N.Y.C.